US012065881B1

(12) United States Patent
Barrett

(10) Patent No.: US 12,065,881 B1
(45) Date of Patent: Aug. 20, 2024

(54) EXTENSION LADDER WEIGHT DISTRIBUTION STAND

(71) Applicant: Calvin Coolridge Barrett, Hedgesville, WV (US)

(72) Inventor: Calvin Coolridge Barrett, Hedgesville, WV (US)

( * ) Notice: Subject to any disclaimer, the term of this patent is extended or adjusted under 35 U.S.C. 154(b) by 0 days.

(21) Appl. No.: 18/445,903

(22) Filed: Mar. 13, 2024

Related U.S. Application Data

(60) Provisional application No. 63/576,993, filed on Mar. 20, 2023.

(51) Int. Cl.
*E06C 7/48* (2006.01)
*E06C 1/04* (2006.01)
*E06C 1/12* (2006.01)
*E06C 1/32* (2006.01)
*E06C 7/14* (2006.01)

(52) U.S. Cl.
CPC .................. *E06C 7/48* (2013.01); *E06C 1/04* (2013.01); *E06C 1/12* (2013.01); *E06C 1/32* (2013.01); *E06C 7/14* (2013.01)

(58) Field of Classification Search
CPC ..... E06C 1/04; E06C 1/12; E06C 1/32; E06C 7/14; E06C 7/48
USPC .................................. 248/210; 182/214, 129
See application file for complete search history.

(56) References Cited

U.S. PATENT DOCUMENTS 3,734,236 A * 5/1973 Houtler ...................... E06C 7/48 182/214
3,779,344 A * 12/1973 Rister ........................ E06C 7/48 182/120
2001/0013445 A1* 8/2001 Adshead ................... E06C 7/48 182/129
2005/0167197 A1* 8/2005 Logiudice ................. E06C 7/48 182/107
2007/0205052 A1* 9/2007 Dawson .................... E06C 7/14 182/129
2017/0198523 A1* 7/2017 Klein ...................... E06C 7/423
2018/0266178 A1* 9/2018 Sapp ......................... E06C 7/48
2020/0095828 A1* 3/2020 Deml ........................ E06C 7/14

* cited by examiner

*Primary Examiner* — Tan Le

(57) ABSTRACT

A mechanical extension ladder support stand that a worker can mount on an extension ladder. Perform work or repairs on interior walls or stairways safely. The device is installed and removed from the ladder, disassembled or repaired without need of tools, safely. The ladder stand is expandable to fit extension ladders of different widths and lengths, without use of tools. When set up to work on a wall, the ladder stand's support board will automatically pivots to match the angle at top of ladder to the wall's surface, without any tools or adjustment. The ladder stand will always rest a padded support board, safety on two or more of the walls vertically framing members. Without damaging or marring the walls. The ladder stand operates safely for the layman on the interior walls without need of any tools, only human hands.

5 Claims, 6 Drawing Sheets

EXTENSION LADDER WEIGHT DISTRIBUTION STAND

CROSS-REFERENCE TO RELATED APPLICATIONS

This application claims priority from a U.S. Provisional Patent Appl. No. 63/576,993 filed on Mar. 20, 2023, which is incorporated herein by reference in its entirety.

FIELD OF INVENTION

The present invention relates to an assembly and the method for mounting and use of an extension ladder weight distribution stand which adjusts to different width extension ladders. Specifically a stabilization device for attachment to an upper part of an extension ladder. More particularly, the present invention relates to an assembly for an extension ladder stand that can be set up inside of a building or stairwell. That will be used on finished wall surfaces for certain applications, without damaging the wall's finished surface. The present invention relates to an assembly which can be installed onto or removed from an extension ladder without use of any tools, safely for users and the building walls.

BACKGROUND

Currently, there are a number of solutions for extension ladder stands. Extension ladders are well known in the art for leaning against houses, trees, for general work, or repairs, and the like. For performing maintenance reaching areas above ground level. Different type extension ladder stands, brackets or arms are for use on solid surfaces of building, roofs, siding. Their solutions do not distribute weight evenly over a large area when used on a soft finished wall surface like drywall without damaging the surface. Other solutions attempt to stabilize extension ladders, but these solutions are similarly unable to meet the needs of the industry because they use complicated methods, required to install it on to or remove it from an extension ladder. extension ladder with tools. Still other solutions seek to distribute weight but also fail to meet industry needs because they do not use a simpler way of distributing weight evenly over a large area and allowing the extension ladder stands to be used on wall covering like of wallpaper, paneling, or painted drywall without damage done to finished wall surface. Other solutions can not be installed on or removed safely from the ladder without tools. Still other solutions seek to allow the use of a support stand that is expandable to match different widths of an extension ladder but only with timely use of tools. Still other solutions do not allow repair or routine maintenance to be performed on the ladder stands without the use of tools. Other solutions attempt to stabilize extension ladders but fail to meet the needs of the industry because they do not allow the different angle adjustments automatically at the top of the ladder to match the ladder's angle to the wall without tools and must continually be manually adjusted each time it is moved to match the angle correctly where the top of an extension ladder rest onto a wall. Other solutions offer only a limited amount of angle sittings the ladder stands can match. Additional solutions will not allow use of extension ladders inside a stairway without damage to a finished wall.

Thus, a need is appreciated for a device and methods that allow the use of an extension ladder in a more economical way inside a structure, on a wall's finished surface.

Thus, a need is appreciated for devices and methods that allow the use of an extension ladder in a more safe way inside a structure and/or the inside of a stairway.

Thus, a need is appreciated for the ability of devices and methods that allow the installation of the extension ladder support stand onto an extension ladder without use of a tool, safely.

Thus, a need is appreciated for the ability of devices and methods that allow the removal of the extension ladder support stand from an extension ladder without use of a tool.

Thus, a need is appreciated for the ability of devices and methods that allow repair or routine maintenance to be performed on an extension ladder support stand without use of a tool.

Thus, a need is appreciated for a device and methods that allow the use of an extension ladder in a more time saving way inside a structure on a finished wall surface.

Thus, a need is appreciated for devices and methods that allow the support of an extension ladder and its user's weight to be distributed over a larger wall surface, distributing the weight load on two more wall stubs, to protect the walls integrity.

Thus, a need is appreciated for a device and methods that allow a support stand on top of an extension ladder to automatically adjust to match the angle of where the wall meets the top of ladder, without tools.

Thus, a need is appreciated for a device and methods that allow the use of a support stand which is expandable to match different widths of an extension ladders, without use of tools The term ladder and extension ladder is interchangeably used hereinafter.

The term ladder rung is the step(s) placed horizontally between a ladder's left and right legs and/or ladder's left and right rails, which are used when climbing on the ladder.

The terms arm, brace, stand, ladder stand or extension ladder support stand is interchangeably used hereinafter and refers to a mechanism mounted on top of an extension ladder, that allows the ladder to be stabilized when set up for use.

The terms wall, surface covering, finished wall, wall surface, wall covering or top wall covering is interchangeably used hereinafter and refers to any wall's top layer covering's, be it plaster, drywall, wood, wallpaper, paneling, painted, coating of all types, wall panel, plastic covering, wall board or metal, be it in a completed state or in an uncompleted state.

The terms spring, extension spring or elastic strip is interchangeably used hereinafter, and refers to any elastic cloth, rubber body or device of metal with elastic power, and refers to an object with the ability to move or grow quickly or by elastic force, as an elastic coil and/or an extension spring with partially open ends, but not limited to.

The term eye, eyelet, hook or eye hook is interchangeably used hereinafter, and refers to any is used hereinafter and refers to a place on the device, where a spring, or elastic mechanism can be attached, without use of a tool.

The terms rivet, bolt head or knob is interchangeably used hereinafter as any post with a larger head mounted on top of a smaller post body, that will retrain strap or lashing from coming off the post, manually without use of a tool.

The terms pad refers to any rubber, rubber pad, vinyl, coating, natural material and/or man make material, is interchangeably used hereinafter and refers to a surface covering which will not mark, mar nor damage a wall's surface, when said pad is laid against the surface of said wall.

The term strap, belt strap, belt, chain, leather strip or rope is interchangeably used hereinafter and refers to any material made of natural, cloth or man made material, natural or man made rubber and or metal with capacity to attach and/or lash two or more parts together manually.

The term stud, framing, wall framing, vertical wall support, vertical wall support framing is interchangeably used hereinafter and refers to any material, be it wood, metal or material used in the art, to build the walls vertical support frame's skeleton, which both gives strength to the wall and supports the upper part of the building.

The term clip, cotter key, clip spring pin, spring pin, hitch pin, lynch pin or wire lock pin is interchangeably used hereinafter, as one in the same meaning: being able to pass into a hole and it will secure parts together manually.

The term sleeve, ring bearing, inner rings, bushing or polished sleeve is interchangeably used hereinafter.

SUMMARY OF THE INVENTION

The following presents a simplified summary of one or more embodiments is intended to neither identify critical elements of all embodiments nor delineate the scope of any or embodiments. Its sole purpose is to present some concepts of one or more embodiments in a simplified form as a prelude to the more detailed description that is presented later.

The principal object of the present invention is therefore directed to an assembly of a device that allows an extension ladder to be used on interior walls for certain purposes, without damage to wall or walls covering(s).

It is another object of the present invention that the assembly can be used on walls in the interior stairways and on steps of a building.

An additional object of the present invention that the assembly provides for the installing of it onto a ladder, removing it from a ladder, using only your hands, saving a large amount of time.

It is another object of the present invention that the assembly can be repaired or performing maintenance to the invention without tools, using only your hands, saving a large amount of time.

It is another object of the present invention that the assembly when set up, will automatically to match the degree of the angle at the top of a ladder to the wall surface, without the need for adjustment or tool.

It is still another object of the present invention that the assembly will work automatically to match the degree of an angle from the top of a ladder to the wall's surface with safety in mind.

It is yet another object of the present invention that the assembly will work automatically to rest on two or more vertical framing wall supports under a finished wall's surface, without damage to the wall or top covering's.

It is a further object of the present invention that the assembly and method of use thereof are cost-effective.

It is yet another object of the present invention that the assembly can be used in both domestic and industrial settings, safely with no wall damage.

It is yet another object of the present invention that the assembly can be used on different width extension ladders without use of a tool.

BRIEF DESCRIPTION OF THE DRAWINGS

The accompanying figures, which are incorporated herein, form part of the specification and illustrate embodiments of the present invention, together with the description, the figures further explain the principles of the present invention and enable a person skilled in the relevant arts to make and use the invention.

FIG. 1 shows device installed onto an extension ladder's leg, with ladder cap seated down on the ladder's leg, using the strap and the knob, which attacks the invention to ladder rung, shows viewing slot at the top of the ladder cap, with spring attached to both ladder cap and wallboard bracket by eyelet and spring rod, FIG. 1 shows both pivot rod and sleeve seated into pivot rod hole and cotter key in pivot rod, FIG. 1 shows both spring rod and clip in place, FIG. 1 shows the wallboard bracket and pad attached to the wallboard, according to an exemplary embodiment of the present invention.

FIG. 2 shows the strap unhooked, this allows the removal of the present invention from the ladder, FIG. 2 shows when the strap is unhooked from the knob on the ladder cap, and not around and/or under the ladder rung this will allow the invention to be removed from the ladder leg, making the device unsecured and removable from the ladder, according to an exemplary embodiment of the present invention.

FIG. 3 shows viewing slot, pivot rod hole, sleeve and pivot rod, not showed is cotter key, FIG. 3 shows the belt strap attached to ladder cap only at a strap bracket and shows strap buckle, FIG. 3 shows an additional way of attaching the invention to a ladder's rung, the invention can be attach to a ladder leg by the belt strap being placed under and back up to the strap bracket and fasten by the strap buckle, according to an exemplary embodiment of the present invention.

FIG. 4 shows a pad installed onto the face of the wallboard, according to one exemplary embodiment of the present invention.

FIG. 5 shows the invention installed on a ladder, with ladder caps seated down on the ladder legs, FIG. 5 shows ladder caps with wallboard brackets mounted on the wallboard, FIG. 5 shows the pivot rod installed through wallboard brackets and not shown are front side of ladder caps and where pivot rod goes through ladder caps, not shown is the springs and the front side of ladder caps where the pivot rod attached to the spring which attach to eyelet(s) on the ladder caps, FIG. 1 shows pivot rod and with cotter key(s) and spring rod and clip(s) installed through wallboard bracket(s), FIG. 5 shows the cotter keys installed through the pivot rod at both sides of the pivot rod and shown is the spring rod with clips through the spring rod, FIG. 5 shows the ladder caps seated on a ladder and security to the ladder rung by straps and knobs, FIG. 5 shows strap brackets attached to ladder caps, but not in use, FIG. 5 shows how ladder caps in the invention are able to slide left and right on pivot rod, FIG. 1 shows viewing slot and ladder cap(s) attached to said pivot rod and FIG. 1 shows ladder cap(s) attached said spring(s) at eyelet(s) and shows spring(s) attached to said spring rod, as stated ladder caps are able to adjust to different widths to install on different widths extension ladders, according to an exemplary embodiment of the present invention.

FIG. 6 shows an additional way the invention can attach to a ladder with two knob attachments, not shown is eyelet or spring, an exemplary embodiment of the present invention.

FIG. 9 shows the hole(s) in pivot rod and the spring rod without cotter key(s) and/or clip(s), FIG. 9 shown is how the holes can be placed in different locations on both the pivot rod and the spring rod, and still secure pivot rod and spring rod to the device, both clip(s) and/or cotter key(s) can be disengaged from the spring rod or pivot by a layman's hand only, according to an exemplary embodiment of the present invention.

FIG. 10 shows the pivot rod is installed through the pivot rod hole only in the wall support board bracket, FIG. 10 shows the spring rod, clip(s) and pad installed to the wall support board bracket, according to an exemplary embodiment of the present invention.

FIG. 12 shows strap with holes at both ends of the strap, this allows the strap to be installed on knob(s) and removed from knob(s) by a layman hand only, FIG. 5 shows straps attached to knobs.

FIG. 13 shows only the eyelet, viewing slot, knob, strap bracket and hole. FIG. 13 shows the pivot rod installed through hole in ladder cap only, not shown is strap, wallboard bracket or cotter key, FIG. 1 shown cotter key, wallboard bracket and strap according to an exemplary embodiment of the present invention.

DETAILED DESCRIPTION

Figure 1:
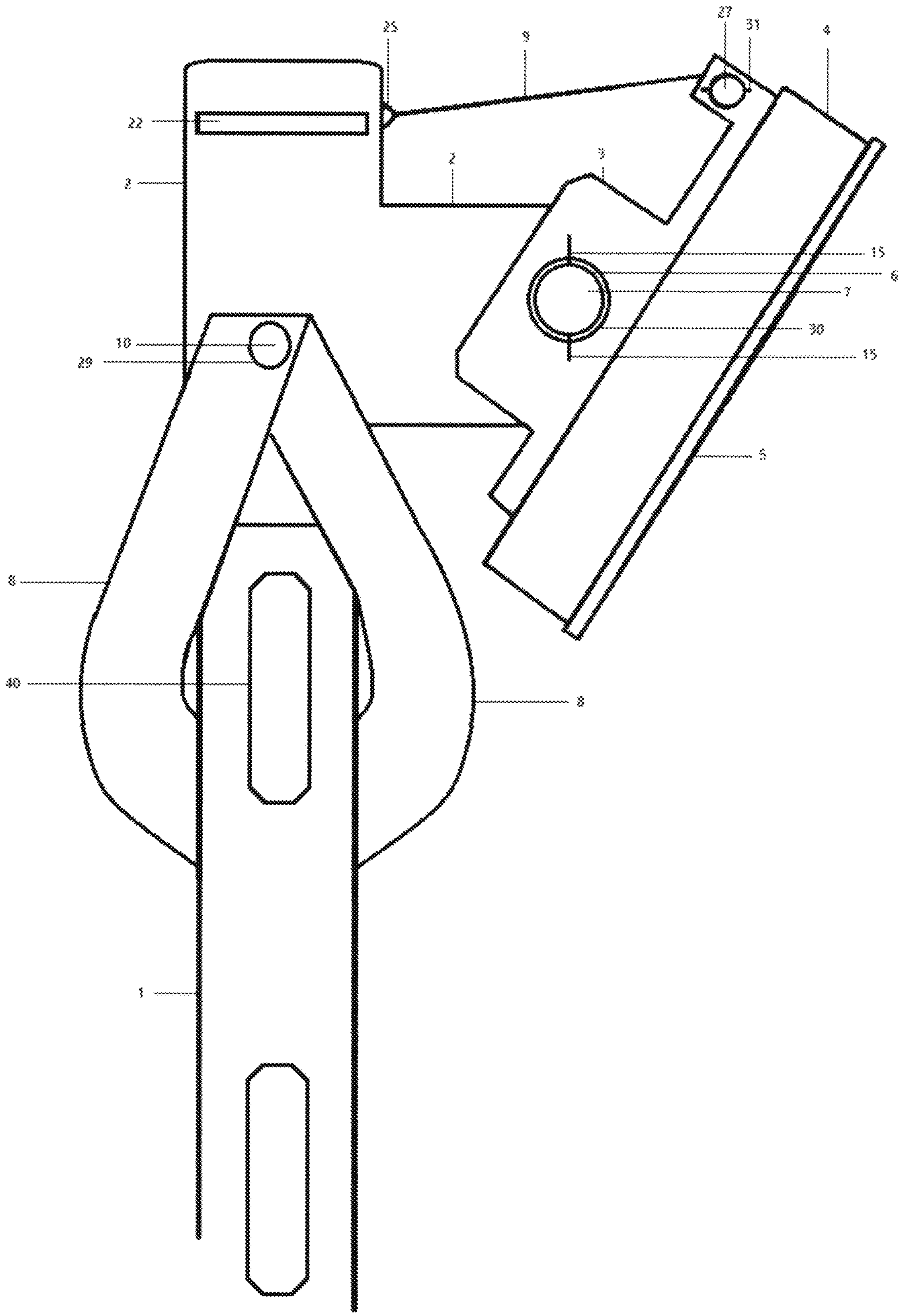
FIG. 1 is a drawing of the side view of the assembly.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an", and "the" are intended to include the plural forms as well, unless the context indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form to facilitate describing the subject innovation. Moreover, the drawings may not be to scale.

Disclosed is an assembly for an extension ladder weight distribution stand, that allows an extension ladder to be used inside of a building for certain applications. For example, allowing a ladder to be set up on a finished wall covering and distributing the weight of the ladder and its user's weight over a larger surface area of the wall. It will distribute the weight of the ladder and its load on two or more of the walls framing members located under a wall's top cover. Spreading the weight to a minimum of two wall studs. The disclosed assembly will rest on the wall's vertical framing, if said wall was constructed by the building code's spacing of the vertical framing members located under the wall's top coverings. The extension ladder weight distribution stand allows the user on an extension ladder to rest safely onto a wall, with the weight distributed over a larger area, keeping the assembly simple and economical to operate.

The assembly can further include the ability to automatically pivot the wallboard bracket and/or wall support board bracket on a pivot rod to match the angle of said wall to the ladder stand. The extension ladder support stand lays flat to the wall, with the ladder cap(s) are seated on and down ladder legs, the pivot rod passes through said ladder caps and said wallboard bracket(s) and/or wall support board bracket, which allows the extension ladder weight distribution stand to adjust automatically to match the angle of the extension ladder to the wall, and the ladder stand's wall board's face will lay flat to the wall.

The assembly can further include the ability to be installed on an extension ladder safety and removed from the ladder safety with no need of tools. The only requirement to mount on an extension ladder or remove it from an extension ladder is a layman's human hand. The assembly can further include the ability to be disassembled and reassembled without a tool, the only requirement is a layman's hand.

The assembly can further include the ability to protect a wall's top covering. The walls framing can be covered by drywall, plaster, wood, vinyl, painted or any materials used to cover over the wall's drywall and/or plaster which is installed over the framed structure. The wall's coverings can be finished or unfinished drywall, plaster or the likes of drywall regardless of material used. The wall's top covering can be, but not limited to painted, metal, wallpaper, paneling, vinyl, plastic, natural wood or unfinished drywall and/or unfinished plaster, the wall will not be damaged by the device, the ladder's or weight load on the extension ladder. This is due to the pad installed on the front side of the wallboard, regardless, being if the pad is permanently installed to the wallboard or removable. The invention can be used on an extension ladder to perform work on the inside of buildings and/or in stairways without damage to the wall or wall's top furnished layer, no matter which stage of work or repair is being performed on the walls.

Parts of the ladder stand can be installed or removed for replacement, repair or maintenance, and performed without tools. Separation of the ladder cap from the wallboard bracket(s) or from the wall support board bracket are done by taking a cotter key(s) out of the pivot rod and removal of the clip(s) out of the spring rod, only need be performed by a layman's hands. The spring will separate from the spring rod with a removal of the cotter key(s) or pin(s). The spring is removed from the eye hooks or eyelet by simple use of your hand. Both pivot rod and spring rod are both able to be replaced after cotter key(s) and/or clip(s) are removed. Straps are removed by unleashing the strap from the knob, and/or bracket buckle. All major parts of the ladder stand can be removed for repair, replacement and/or maintenance is performed without tools. The exemplary embodiment of this invention will next be described with respect to the figures, being of one particular version of the invention.

Figure 5:
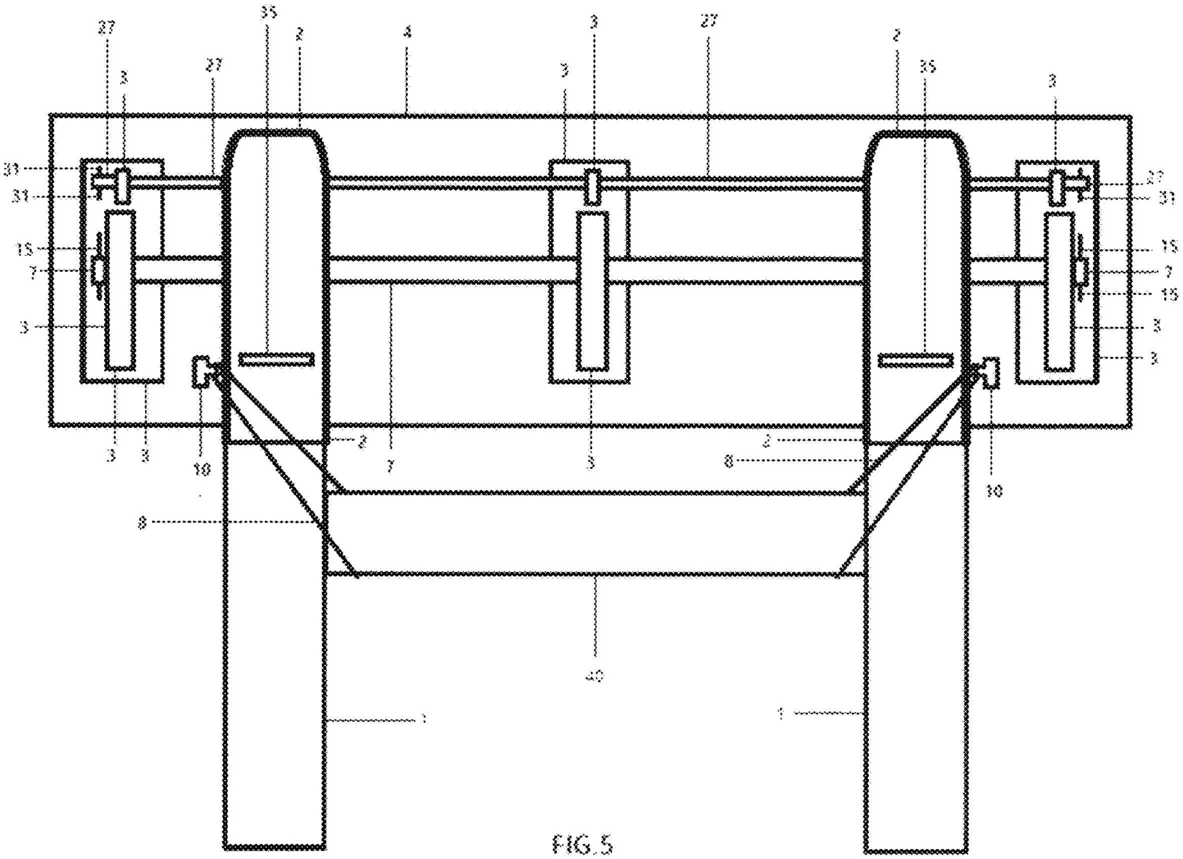
FIG. 5 shows another embodiment of the assembly, viewed mounted at the top of the ladder viewed from the back side of ladder caps.
Figure 10:
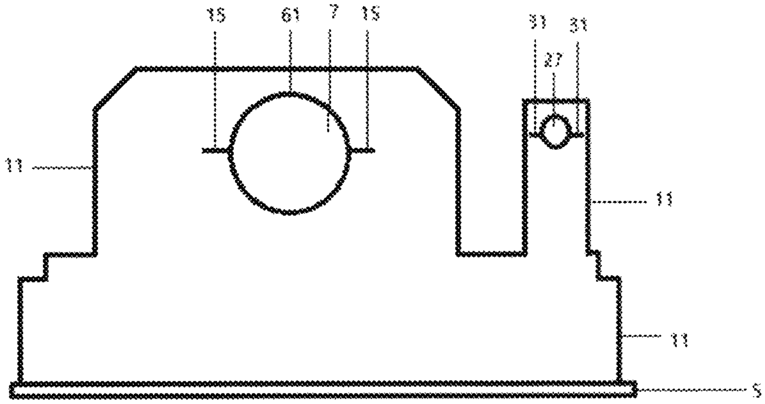
FIG. 10 shows another embodiment of assembly, a side view of wall support board bracket, which is the wallboard bracket and wallboard constructed as a single piece, shown is pivot rod hole(s), pivot rod with the cotter key installed through the pivot rod.

Referring to FIG. 1 shows the right side of the device, an exemplary embodiment of this invention, an assembly of an extension ladder weight distribution stand, a side view of the device, mounted on an extension ladder. As shown in FIG. 1, ladder cap 2 is attached to wallboard bracket 3 by pivot rod 7, wallboard bracket 3, set at 90 degrees onto the wallboard 4, they will automatically pivot on pivot rod 7 to match the walls angle using only the ladder's weight, pivot rod 7 can be of any material known in the relevant art's, depending on material use in manufacturing of pivot rod 7, pivot rod 7 is sized at a minimum of two times stronger than the expected weight load of the extension ladder's duty rating, being of only one particular version of the invention. Not shown is the pair of ladder cap(s) 2, FIG. 5 shows pair of ladder cap(s) 2, each to be installed down the top of the ladder leg(s) 1 and/or rail(s), FIG. 1 shows ladder cap 2 attached to wallboard 4 by pivot rod 7, FIG. 5 shows how ladder(s) 2 are able to slide horizontally on pivot rod 7 and spring rod 27, to fit different width ladders. FIG. 1 shows cotter key 15 which installs into pivot rod 7, cotter key(s) 15 secures ladder cap(s) 2 and wallboard bracket(s) 3 on pivot rod 7, FIG. 5 shows how cotter key(s) 15 keeps pivot rod 7 from sliding through wallboard bracket 3 from right or left sides. FIG. 1 shows pivot rod 7 installed into sleeve 30, sleeve 30 is sized for pivot rod 7. Shown is hole 6. Hole 6 is installed into ladder cap(s) 2 and wallboard bracket(s) 3 and/or wall support board bracket 11, and is sized to allow sleeve 30 to be installed into hole 6, not shown in FIG. 1 is wall support board bracket 11, FIG. 10 shows wall support board bracket 11. Cotter key(s) 15 secures ladder cap(s) 2 and gives ladder cap 2 the ability to pivot and slide sideways on pivot rod 7 without disconnecting from pivot rod 7 and/or wallboard bracket(s) 3, FIG. 5 shows a set of cotter key(s) 15 installed at each end pivot rod 7. Being of only one particular version of the invention. A preferred material of construction of ladder cap 2 and wall bracket 3 is aluminum, but the frames may be any material known in the relevant art's, including other typical ladder materials. FIG. 1 shows extension ladder leg 1 and/or ladder rail(s) and ladder rung 40, both not are not part of the patent, this is to demonstrate how ladder cap(s) 2 fits over and sits down on ladder leg(s) 1 or ladder rail(s), as shown in FIG. 1. Ladder cap 2 is installed down the top of ladder leg 1. It is to be understood that this disclosure is not limited to any single specific embodiments or enumerated variations.

FIG. 1 shows that wallboard bracket 3 will automatically pivot on pivot rod 7 so wallboard 4 will match the angle of the ladder to the wall when the ladder is laid onto the wall, with only the weight of a ladder. Being of only one particular version of the invention. Showed is wallboard bracket 3 attached to wallboard 4. FIG. 5 shows wallboard bracket(s) 3 where they are attached to wallboard 4. Wallboard 4 will spread the ladder's, ladder stand and ladder's duty rated weight load over a larger surface area on a wall. Wallboard 4 can be of any material known in the relevant art's, materials such as aluminum, fiberglass or wood, with thickest of said materials having the capability of carrying the weight of an extension ladder, the extension ladder weight distribution stand and ladders maximum duty rated weight load. Said wallboard 4 can be constructed with a width of two inches or more, but preferably a width of four inches or larger will distribute the weight load over a larger area of wall surface. Wallboard 4 can be constructed only two inches longer than the building code requirements of a wall's vertically framing, assuming said build code's are stated as to be measured from center to center of said vertical framing members. Building codes due apply to the spacing of the vertical wall support members. Said building codes enable the wallboard 4 to always span a minimum of two vertical wall support members at all times when laid to a wall. Wallboard 4 distributes the weight of the ladder and the ladder's user over a larger surface area of the wall and the wall's framing. Being of only one particular version of the invention. FIG. 1 shows pad 5 installed on the front the wallboard 4 ladder, pad 5 allows the ladder stand not to marring or damage to the wall's top covering, pad 5 can be of any material known in the relevant art's, being of only one particular version of the invention. Shown is sleeve 30, a sleeve, ring bearing, inner rings, bushing or polished sleeve, all optional, sleeve 30 is inserted into hole 6 on wallboard bracket(s) 3 and ladder cap(s) 2. FIG. 1 shows sleeve 30 in wallboard 3, sleeve 30 can be of any material known in the relevant art's. Sleeve 30 allows both ladder cap(s) 2 and wallboard bracket(s) 3 to swivel on pivot rod 7, with less fiction. FIG. 1 shows sleeve 30 with pivot rod 7 installed through sleeve 30 in wallboard bracket 3. Sleeve 30 allows both wallboard bracket(s) 3 and ladder cap(s) 2 to pivot on pivot rod 7, sleeve 30 is installed into ladder cap(s) 2, wallboard bracket(s) 3 and/or wall support board bracket 11, and is sized to allow pivot rod 7 through sleeve 30 and still pivot in ladder cap(s) 2 and wallboard bracket(s) 3 and/or wall support board bracket 11. Not shown in FIG. 1 is wall support board bracket 11, FIG. 10 shows wall support board bracket 11. Sleeve 30 which is sized to allow pivot rod 7 to past firmly through said sleeve(s) 30, and still be removed by a layman hands, being of only one particular version of the invention. FIG. 1 shows strap 8, which can be constructed of a rope, chain, an elastic strap, leather, and or an elastic strap material, or any material known to the relevant art's. Shown is knob 10, strap 8 to be secured manually to knob 10 and looped under and/or around the ladder rung 40 and secured back to knob 10, which secures the ladder stand to ladder leg 1, (ladder rails). Shown is strap 8 installed to knob 10 from both ends. Being of one particular version of the invention. It is to be understood that this disclosure is not limited to any single specific embodiments or enumerated variations.

FIG. 1 shows attaching strap 8 using strap hole 29 to knob 10 and looping one end of strap 8 under ladder leg 1 (ladder rails) and back up and installing strap hole 29 onto knob 10 will fasten ladder cap 2 to ladder leg 1. Being of only one particular version of the invention. Shown is knob 10 which allows strap 8 the ability to fasten the ladder cap 2 onto ladder leg 1. Showed is ladder rung 40, which is not part of the invention, ladder rung 40 is only to demonstrate how strap 8 fits under and/or around ladder rung 40. Strap 8 holds ladder cap 2 secure onto top of ladder leg 1 safety. FIG. 5 shows a pair of strap(s) 8 in which a pair of strap(s) 8 holds both the right and left sides of the invention onto the ladder leg(s). Being of only one particular version of the invention. FIG. 1 shows knob 10, which can be a shaft with a larger head, hook or knob that holds strap 8 in place by strap hole 29, knob 10 allows setting and removal of strap 8, which allows separation of ladder cap 2 from ladder leg 1 only requiring a layman's hands. Being only one of the particular versions of the invention. Shown is viewing slot 22, a visual way to see through ladder cap 2. Viewing slot 22 is installed into upper side of ladder cap(s) 2, this allows the user to see that the ladder cap(s) 2 is firmly down on ladder leg 1, being of only one particular version of the invention. Viewing slot(s) 22 a single viewing slot 22 or can be a set each installed on the top right and top left side and/or front and back sides of ladder cap(s) 2. The exact placement of viewing slot 22 on ladder cap(s) 2 is only relative to being able to visually see that ladder leg 1 is firmly seated into ladder cap(s) 2. Viewing slot 22 allows the ability to confirm visually that ladder cap(s) 2 is seated safely on the extension ladder, which only requires a layman's sight. Being of only one particular version of the invention. It is to be understood that this disclosure is not limited to any single specific embodiments or enumerated variations.

FIG. 1 shows eyelet 25 installed on ladder cap 2. Eyelet(s) 25 can be any type of eyelet and/or hook that fastens spring 9 to ladder cap 2. Shown is spring 9 connected to eyelet 25 and spring rod 27, eyelet 25 allows spring 9 to be connected with ladder cap 2 and over to wallboard bracket 3, being of only one particular version of the invention. Spring 9 can be a metal spring or an elastic strap, any device of metal with elastic power of any materials known to the relevant art's and refers to an object with the ability to move or grow quickly by elastic force, as an extension spring with partially open ends and/or end rings, but not limited to. Being of only one particular version of the invention. Spring 9 when on or in eyelet 25 and installed on spring rod 27 with spring rod 27 through wallboard bracket(s) 3, which is attached to wallboard 4, spring 9 holds wallboard 4 up right and/or partially upright till wallboard 4 is laid on a wall. At which time both wallboard bracket(s) 3 and wallboard 4 will pivot on pivot rod 7 to match the angle of the top of the ladder to the wall. Spring(s) 9 supports wallboard(s) bracket 3 in an upright manor till wallboard 4 is set onto a wall. Being of one particular version of the invention.

FIG. 1 shows spring rod 27 is installed through wallboard 3, which is installed horizontally and vertically to match wallboard bracket(S) 3, FIG. 5 shows wallboard bracket(s) 3 in line horizontally, Spring rod 27 allows spring(s) 9 the ability to slide sideways with ladder cap(s) 2 on spring rod 27 without disconnecting from wallboard bracket(s) 3. Shown is clip 31 installed through spring rod 27. Clip 31 stops spring rod 27 from sliding out the ends of wallboard bracket 3, which stops spring 9 from coming off spring rod 27. Spring rod 27 allows spring 9 the ability to slide sideways on spring rod 27. Clip(s) 31 stops spring rod 27 from disconnecting from wallboard bracket(s) 3 which is attached to wall board 4, Being of only one particular version of the invention.

Figure 12:
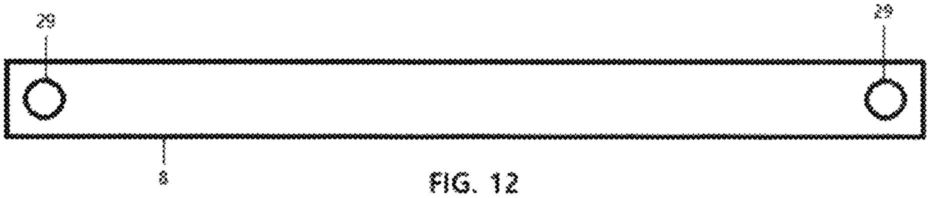
FIG. 12 shows another embodiment of assembly, a strap that is used to secures the ladder cap(s) to top of a ladder's leg(s), safety.

FIG. 5 shows the pair of clip(s) 31, each installed through spring rod 27, at the far right side and far left sides of spring rod 27. Shown is strap hole 29, a hole located on both ends of strap 8. FIG. 12 shows two hole(s) 29, one each located in the far right and far left sides strap 8. Hole(s) 29 allows both ends of strap 8 to be installed on and/or removed from knob 10 with only a layman's hand. Being of only one particular version of the invention. It is to be understood that this disclosure is not limited to any single specific embodiments or enumerated variations.

Figure 2:
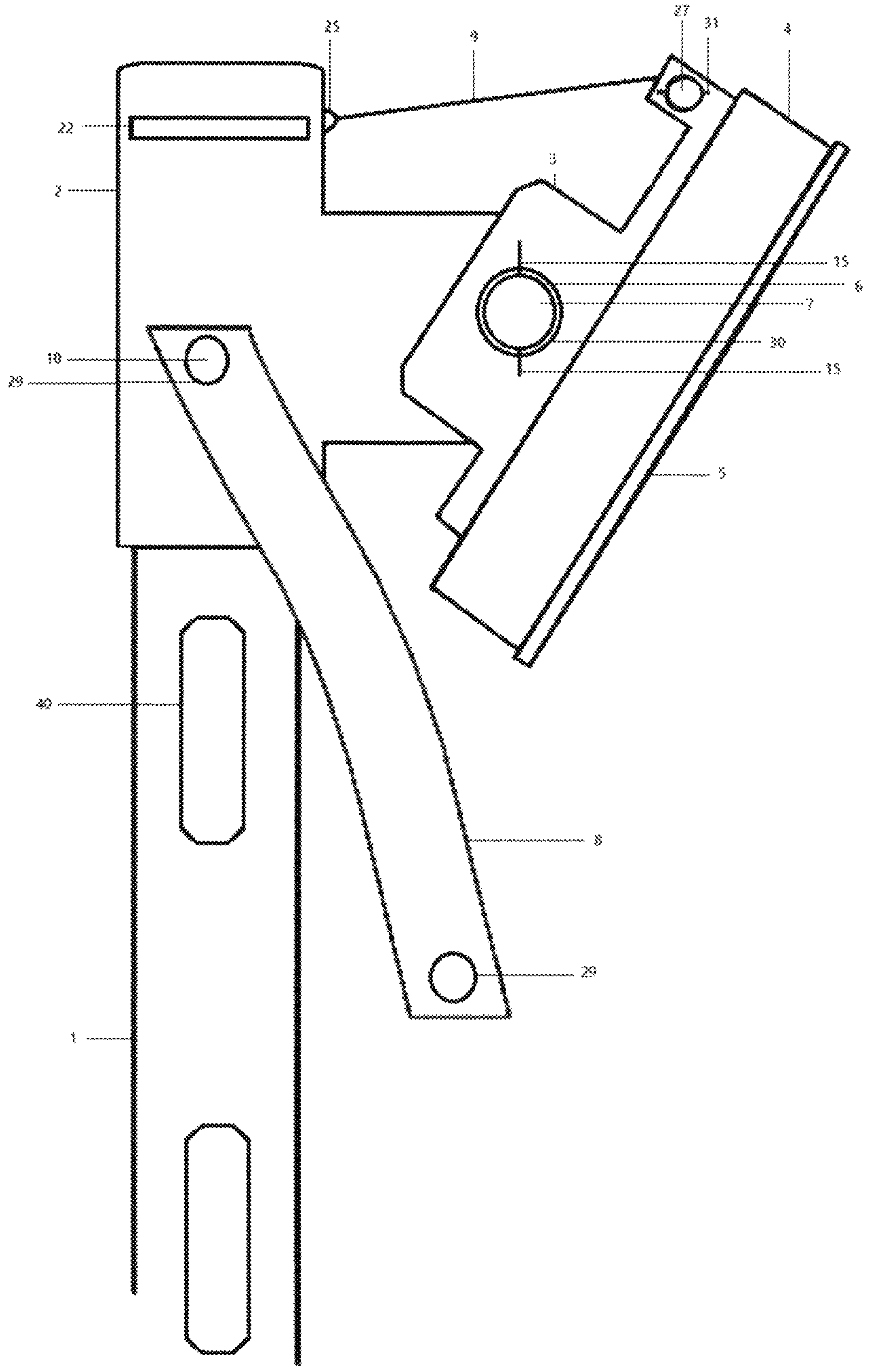
FIG. 2 shows the embodiment of the assembly as shown in FIG. 1 with all the parts and pieces in FIG. 1.

Referring to FIG. 2, shown is the right side of ladder stand, one exemplary embodiment of this device. FIG. 2 shows all the same art, with the same parts with matching numbers to names and as shown in FIG. 1. FIG. 2 shows only one side of strap 8 installed onto knob 10, being one exemplary embodiment of the device, the removal of strap 8 from knob 10 requires no tools. Showed is ladder cap 2, with one end of strap 8 unhook from knob 10 and loosen from under ladder leg 40 ladder cap 2 now can be removed from ladder leg 1 without use of a tool, separation only required a layman's hand. Being one exemplary embodiment of the device. Showed is hole strap 29 in strap 8. Hole strap 29 is a hole installed at both ends of strap 8, which allows strap 8 to be completely removed from knob 10, without a tool. FIG. 12 shows strap 8 with hole 29 installed at both ends of strap 8. Being of only one particular version of the invention. Hole strap 29 are hole(s) installed into both ends of strap 8, which allows strap 8 to be completely removed from knob 10, allowing replacement of strap 8 without tools. Being only one embodiment of the device.

Figure 3:
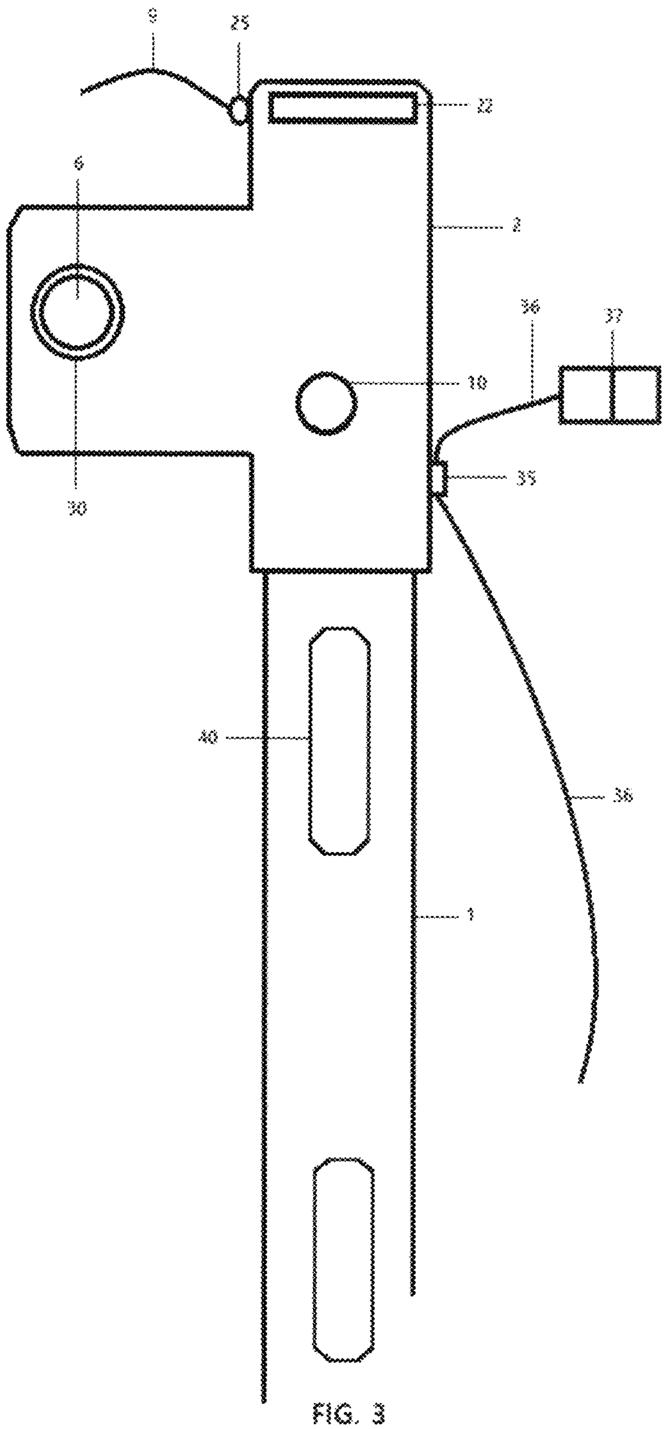
FIG. 3 shows another embodiment of the assembly, the side view of ladder cap only seated down on the ladder leg, but not shown is the strap, shown is the knob, shown is the spring in place.

FIG. 3 shows left side ladder cap 2, one exemplary embodiment of the assembly of the device in which the ladder cap 2 is detached from wallboard bracket 3, FIG. 1 shows wallboard bracket 3, shown is sleeve 30, not shown is wallboard bracket 3, FIG. 1 shows wallboard bracket 3, shown is sleeve 30, not shown is both pivot rod 7 and cotter key 15. FIG. 1 shows both pivot rod 7 and cotter key 15. FIG. 3 shows hole 6, hole 6 is sized to allow sleeve 30 to be installed into hole 6. The removal of cotter key 15 allows pivot rod 7 to be separate from ladder cap 2, which allows ladder cap 2 to be separated from wallboard bracket 3, without use of any tools, FIG. 1 shows wallboard bracket 3. Being of only one particular version of the invention. Not shown in FIG. 3 is strap 8, strap 8 has been completely removed from knob 10, FIG. 1 shows strap 8. FIG. 3 shows knob 10 and an alternate embodiment of the assembly of the device, in which strap bracket 35 is mounted on the back side of ladder cap 2. Shown is belt strap 36 installed down through strap bracket 35. Being one of the particular versions of the invention. Showed is buckle 37 attached to belt strap 36. Shown is belt strap 36 unleashed from ladder rung 40, to attach ladder cap 2 to ladder rung 40, place belt strap 36 under and/or around ladder rung 40 and back up and hand fastened to buckle 37. Belt strap 36 allows ladder cap 2 to be installed to or from ladder leg 1 safely without use of any tools. Ladder leg 1 and ladder rung 40 is not part of the device, only shown as demonstration. To separate ladder cap 2 from ladder rung 40, just unleash belt strap 36 from buckle 37, which only requires a layman's hand. Being of only one particular version of the invention. The exact placement or location of strap bracket 35 and/or knob 10 onto ladder cap 2 is only relevant in so long as they retain the ability to fasten ladder cap 2 onto ladder rung 40 safely. Being of only one particular version of the invention. Shown is slot 22 which allows users to see that ladder cap(s) 2 are visually seated down on ladder(s) leg 1. FIG. 3 shows spring 9 attached to eyelet 25 and not attacked to spring rod 27.

Spring 9 can be removed from spring rod 27 by removing clip 31 and spring rod 27 comes out of wallboard bracket(s) 3 and ladder cap(s) 2 and from spring 9, by removal of clip 31 being only one of the embodiments of the device, not shown in FIG. 3 is spring rod 27, clip 31 and wallboard bracket 3, FIG. 1 shows spring rod 27, clip 31, and wallboard bracket 3, removal of clip 31 from spring rod 27, only requires a layman's hand. Shown is spring 9 attached to eyelet 25. Spring 9 can be removed off eyelet 25 by a layman hands, being one particular exemplary of the embodiment. Ladder cap 2 can be constructed with eyelet 25, knob 10 and/or buckle 37 as part of a shingle unit, or each a single parts. It is to be understood that this disclosure is not limited to any single specific embodiments or enumerated variations.

Figure 4:
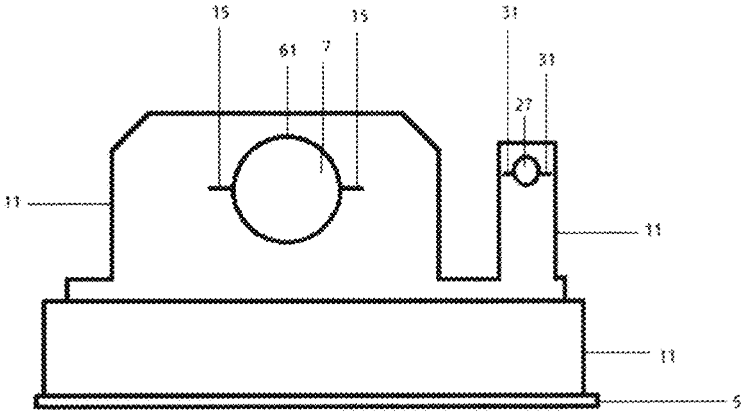
FIG. 4 shows another embodiment of the assembly, side view of only the wallboard bracket and wallboard, shown is the pivot rod hole and pivot rod, with the cotter key through the pivot rod, according to one exemplary embodiment of the present invention. Shown is the spring rod with the clip through the spring rod, not shown is the sleeve which is not needed for the device to operate.

FIG. 4 shows a side view of wallboard bracket 3, as shown in FIG. 1. FIG. 4 shows wallboard bracket 3 attached to wallboard 4, with pad 5 attached to wallboard 4 on the bottom side, being one of the embodiments of the device, not shown is sleeve 30 or hole 6, FIG. 1 shows sleeve 30 and hole 6. FIG. 4 shows hole 61 with pivot rod 7 installed through hole(s) 61 in wallboard bracket 3. FIG. 4 shows cotter key 15 installed through pivot rod 7. Hole(s) 61 is installed into wallboard bracket(s) 3 and ladder cap(s) 2 to pivot on pivot rod 7, without sleeve 30, FIG. 1 shows sleeve 30 and ladder cap 2, with hold 6. Hole(s) 61 is sized to allow pivot rod 7 to pass firmly through said hole(s) 61 and still able to pivot in ladder cap(s) 2, wallboard bracket(s) 3 and/or wall support board bracket 11, without hole 6, not shown in FIG. 4 is wall support board bracket 11, FIG. 10 shows wall support board bracket 11. Hole(s) 61 is installed into ladder cap(s) 2, wallboard bracket(s) 3 and/or wall support board bracket 11, and is sized depending on material use in manufacturing of pivot rod 7, pivot rod 7 is made of any material known in the relevant art's, sized at a minimum of two times stronger than both the extension ladder and ladder duty weight load rating, with said ladder stand installed, being of only one particular version of the invention. FIG. 4 shows hole 61, not shown hole 6 or sleeve 30, a polished sleeve and/or bearing ring, which will reduce friction on pivot rod 7, but not required for the device to operate, FIG. 1 Shown hole 6 and sleeve 30. Shown is hole(s) 61 which allows ladder cap(s) and wallboard bracket(s) 3 to pipit on pivot rod 7 without sleeve 30, FIG. 1 show ladder cap 2. Shown in FIG. 4 is spring rod 27 and clip(s) 31 installed into wallboard bracket 3, being of only one particular version of the invention. It is to be understood that this disclosure is not limited to any single specific embodiments or enumerated variations.

Figure 9:
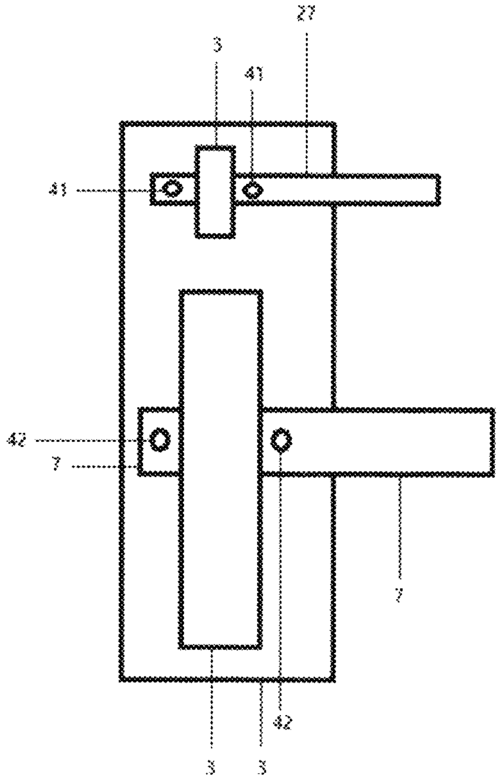
FIG. 9 shows another embodiment of assembly, a top view of the wall board bracket only without wallboard.

FIG. 5 shows one exemplary of the embodiment, FIG. 5 shows the view looking from top of an extension ladder to the invention, seeing the back of ladder cap(s) 2 attached. FIG. 5 shows three wallboard bracket(s) 3, mounted on wallboard 4, shown is one wallboard bracket 3 installed at the far left and one installed to the far right side with a third wallboard bracket 3 in the center of wallboard 4. Being of only one particular version of the invention. Shown are two ladder cap(s) 2 installed over and seated on ladder legs 1. FIG. 5 shows ladder caps 2 installed, one each on the right side and one on the left side of the center wallboard bracket 3. This gives ladder cap(s) 2 the ability to slide sideways between the outer wallboard bracket(s) 3 without disconnecting from wallboard bracket(s) 3, the ability to slide each ladder cap 2 to different widths, allows the invention to adjust for different width of an extension ladder. Being of only one particular version of the invention. Showed is center wallboard bracket 3, which adds support for pivot rod 7. FIG. 5 shows pivot rod 7, FIG. 1 shows ladder cap(s) with pivot rod 7 installed through ladder cap 2, FIG. 4 shows pivot rod 7 installed through wallboard bracket 3. Being of only one particular version of the invention. FIG. 5 shows knobs 10 on both ladder cap(s) 2, with strap(s) 8 installed on both knob(s) 10, with strap(s) 8 installed under ladder rung 40 and installed back up on knob(s) 10. FIG. 5 shows strap brackets 35, strap bracket(s) 35 is an optional way to secure ladder stand to an extension ladder using belt strap 36 and buckle 37, not shown is belt strap 36 and buckle 37, FIG. 3 shows strap bracket 35 mounted on the back side of ladder cap 2, with belt strap 36 and buckle 37, being only one exemplary of the embodiment. FIG. 5 shows cotter key(s) 15 installed through hole(s) 42 not shown in spring rod 7 at both ends, cotter key(s) 15 which can be a cotter key, clip, slip pin, or any type device which will go through hole 42 not shown, cotter key(s) 15 secures pivot rod 7 manually in wallboard(s) 3, FIG. 9 shows hole 42 and different placements of hole(s) 42. Shown is cotter key(s) 15 holds pivot rod 7 in place, cotter keys 15 are installed and removed from pivot rod 7 manually. Being of only one particular version of the invention. FIG. 5 shows that pivot rod 7 permits ladder cap(s) 2 to slide horizontally between the two outer wallboard bracket(s) 3, which allows ladder weight distribution stands to fit on different width extension ladders. Being of only one particular version of the invention. FIG. 5 show clip(s) 31 and spring rod 27, separation of clip 31 from spring rod 27 only requires removal of clip 31 by a layman's hand. Shown is spring rod 27 installed though wallboard bracket(s) 3. Shown is clip(s) 31 which can be a cotter key, clip, slip pin, or any type device which will go through hole 41, and removed from spring rod 27 manually and when installed clip(s) 31 still secures spring rod 27 through wallboard(s) 3, not shown is hole 41, FIG. 9 shows hole(s) 41 and different placements of said clip(s) 31, shown is that clip(s) 31 which secures spring rod 27 to wallboard bracket(s) 3, clip(s) 31 are placed through hole(s) 41 at both ends of spring rod 27 at the far left and right side(s) of the outside of the wallboard bracket(s) 3. Being of only one particular version of the invention. Spring rod 27 can be removed from wallboard bracket(s) 3, when clip(s) 31 are removed out of spring rod 27. Spring 9 not shown, can be separated by removal of clip(s) 31, without tools, by only a layman's hand, FIG. 5 shows a view of the embodiment of the device from where spring 9 or eyelet 25 can not be viewed, FIG. 1 shows spring(s) 9 and eyelet(s) 25, spring 9 is attached to eyelet 25 and spring rod 27, FIG. 5 shows spring 9 can slide between the two outer wallboard bracket(s) 3, allowing Ladder cap 2 to slide horizontally on spring rod 27, allowing the ladder stand to fit different width ladders, this being only one exemplary of the embodiment.

Figure 6:
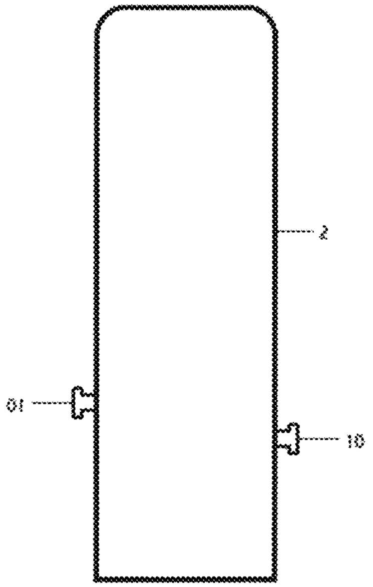
FIG. 6 shows another embodiment of the assembly, the back side view of a ladder cap only, according to an exemplary embodiment of the present invention.

FIG. 6 shows one exemplary embodiment of the device, shown is the back view of ladder cap 2. FIG. 6 Shows knob(s) 10 mounted at both sides ladder cap 2, at different locations of ladder cap 2, being of only one particular version of the invention. The exact placement or location of knob(s) 10 and/or strap bracket 35 on ladder cap 2 is only relevant in so long as they retain the ability to fasten strap 8 to ladder cap 2 onto ladder leg 1 safely. Not shown is leg 1, strap 8, and strap bracket 35, FIG. 1 shows ladder leg 1, strap 8, FIG. 3 shows strap bracket 35. Being only one exemplary of the embodiment.

Figure 7:
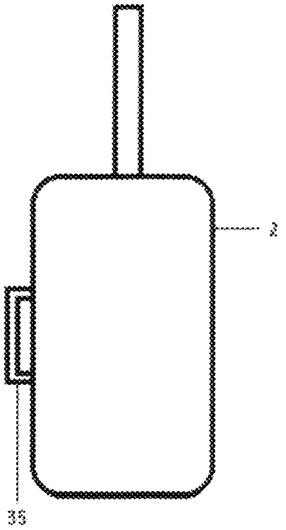
FIG. 7 shows another embodiment of the assembly, top view of ladder cap, according to an exemplary embodiment of the present invention, with a different strap attachment mounted, only a strap bracket on the back side of the ladder cap, not shown is eyelet or spring, according to an exemplary embodiment of the present invention.

FIG. 7 shows an alternate exemplary embodiment of the assembly in which the device shows the top view looking down on ladder cap 2. FIG. 7 Shows strap bracket 35 placed on the side of ladder cap 2. Being of only one particular version of the invention. Not shown in FIG. 7 is knob 10, spring 9, and eyelet 25 which is shown in FIG. 1. The exact placement or location of knob(s) 10 and/or strap bracket(s) 35 on ladder cap(s) 2 is only relevant in so long as they retain the ability to fasten strap 8 and/or belt strap 36 to ladder cap 2 onto ladder leg 1 safely. FIG. 1 shows spring 9, eyelet 25, knob 10, strap 8 and, FIG. 3 shows belt strap 36. Being only one exemplary of the embodiment.

Figure 8:
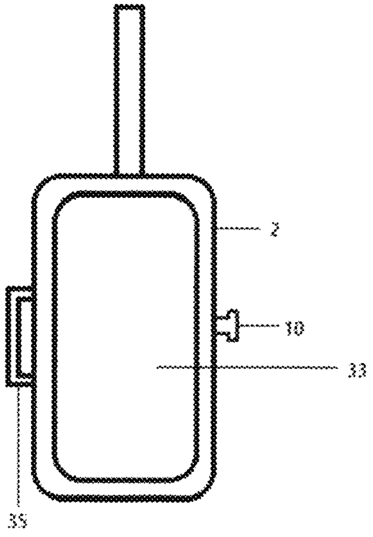
FIG. 8 shows another embodiment of the assembly, bottom view of ladder cap only, looking into where the ladder leg is inserted up into the ladder cap, shown is two different types of strap attachments, knob and strap bracket, not shown is eyelet or spring, according to an exemplary embodiment of the present invention.

FIG. 8 Shows one exemplary embodiment of the device, the bottom view looking into ladder cap 2, where ladder leg 1 is inserted when device is installed onto an extension ladder, not shown and not part of device is ladder leg 1, FIG. 3 shows ladder leg 1, ladder leg(s) 1 which is not part of the invention. FIG. 8 shows one embodiment of the device with knob 10 and strap bracket 35 both mounted to different sides of ladder cap 2. The exact placement or location of strap bracket 35 and/or knob 10 on ladder cap 2 is only relevant so long as they retain the ability to fasten ladder cap(s) 2 onto ladder leg 1 safely. Being of only one particular version of the invention. Showed is ladder leg opening 33, the opening in the bottom of ladder cap 2 where ladder leg(s) 1 fits into ladder cap(s) 2. Opening 33 is where ladder cap 2 fits over and down ladder leg 1. Not shown in FIG. 8 is ladder leg 1, spring 9, and eyelet 25, FIG. 1. shown ladder leg 1, spring 9, and eyelet 25. Ladder cap(s) 2 will fit over top of ladder leg(s) 1, and sit down on said extension ladder leg, FIG. 5 both show ladder leg(s) 1, FIG. 1 shows ladder leg 1 installed by strap 8 onto knob 10, FIG. 3 shows belt strap 36 through strap bracket 35 and belt bucket 37, but not attached under ladder rung 40, ladder rung 40 is not part of the invention, FIG. 3 shows belt strap 36 unsecured to belt bucket 37 on one end, ladder cap 2, FIG. 3 shows ladder cap 2 is only seated on top of ladder leg 1 and not secured to ladder rung 40, FIG. 5 shows a pair of ladder cap(s) 2 installed on both ladder rung(s) 40 by strap(s) 8 installed to knob(s) 10. It is to be understood that this disclosure is not limited to any single specific embodiments or enumerated variations, being of one particular version of the invention and being only one exemplary of the embodiment.

FIG. 9 Shows one exemplary embodiment of the device, a top view of wallboard bracket 3 without wallboard 4, wallboard 4 is shown in FIG. 5. Shown in FIG. 9 is hole(s) 42 and an alternate placement for cotter key(s) 15 through pivot rod 7, not shown is cotter key(s) 15, FIG. 5 shows cotter key(s) 15. Shown is the placement of hole(s) 42 in pivot rod 7 is only relevant to secure pivot rod 7 to wallboard bracket(s) 3, so ladder cap(s) 2 slides horizontally between wallboard bracket(s) 3 on wallboard 4 or between wall support board bracket 11, and pivot rod 7 stays in place, not shown in FIG. 9 is wall support board bracket 11, FIG. 10 shows wall support board bracket 11, not shown in FIG. 9 is cotter key(s) 15 and wallboard 4, or ladder cap(s) FIG. 5 shown ladder cap(s) 2, cotter key 15 and wallboard 4. Shown in FIG. 9 is hole(s) 41 and an alternate placement for clips(s) 31 through spring rod 27, not shown is clip(s) 31, FIG. 5 shows clips(s) 31. Shown in FIG. 9 is that the placement of hole(s) 41 and hole(s) are only relevant to secure spring rod 27 to the wallboard brackets 3 or wall support board bracket 11, spring rod 27 goes through spring 9 and spring 9 is attached to eyelet 25, eyelet is attached to ladder cap(s) 2, when ladder cap(s) 2 slides horizontal on pivot rod 7, spring 9 will slide on spring rod 27, ladder cap(s) 2 with spring(s) 9 attached to eyelet(s) 25 will slide together on pivot rod 7 and spring rod 27 respectfully, not shown in FIG. 9 is clip(s) 31 and wallboard 4, or ladder cap(s) FIG. 5 shown ladder cap(s) 2, clip(s) 31 and wallboard 4, not shown in FIG. 9 is wall support board bracket 11, FIG. 10 shows wall support board bracket 11. Only a layman's hand is needed to install or remove cotter key(s) 15 out of hole(s) 42 in rod 7 or clip(s) 31 from hole(s) 41 in spring rod 27. Only a layman's hand is needed to install or remove clip(s) 31 from hole(s) 41 in spring rod 27. Being of only one exemplary embodiment of the device.

Figure 13:
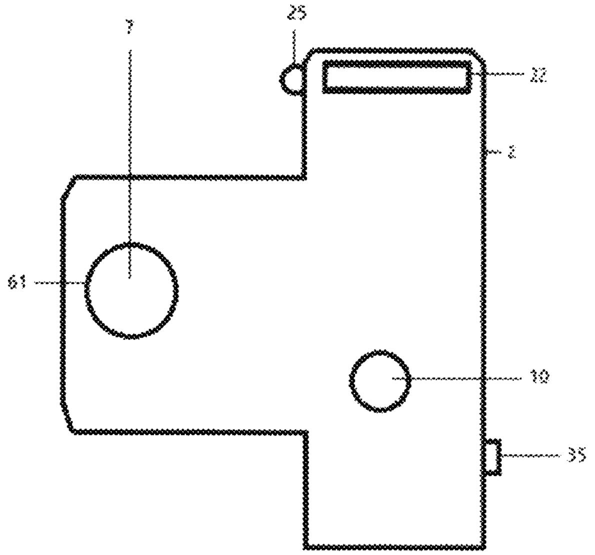
FIG. 13 shows another embodiment of the assembly, the side view of ladder cap only, not seated down on the ladder leg.

FIG. 10 shows one exemplary embodiment of the device, a side view of wall support board bracket 11, which can be constructed as a single piece in this device. Showed in FIG. 10 is wall support board bracket 11, being of only one particular version of the invention, a variation of that which is shown in FIG. 4, FIG. 4 shown wallboard bracket(s) 3 and wallboard 4, FIG. 10 shows wall support board bracket 11 which performs the same function as wallboard(s) 3 and wallboard 4 in FIG. 4. Wall support board bracket 11 is constructed to match the shape of wallboard bracket(s) 3 and wallboard 4 as shown in FIG. 5, wall support board bracket 11 is an alternative to wallboard bracket 3 and wallboard 4, being of only one particular version of the assembly of the device. The referred material of construction of wall support board bracket 11 is aluminum, but the embodiment may be any material known in the relevant art, including other typical materials such as fiberglass or other metals, retaining the same ability to support an extension ladder and its duty rating (weight load). FIG. 10 shows pivot rod 7 with cotter key 15 installed through pivot rod 7. Shown is hole 61 with pivot rod 7 protruding out of hole(s) 61. Showed in FIG. 4 is hole(s) 61 with greater details. FIG. 10 shows spring rod 27 with clip 31 installed through spring rod 27. Being of only one particular version of the invention. FIG. 10 shows pad 5 installed on the front side of wall support board bracket 11, FIG. 1 shows pad 5. Being of only one particular version of the invention. Pad 5 allows wall support board bracket 11 to be laid on a wall without marring or damage to wall covering. Shown is hold 61, hold 61 goes through wall support board bracket 11 and ladder cap 2, not shown is ladder cap 2, FIG. 1 shown ladder caps 2. Both wall support board bracket 11 and ladder cap(s) 2 pivot on pivot rod 7, which is held in place in hole(s) 61 by cotter key(s) 15, FIG. 13 shows ladder cap 2 with hole 61 and pivot rod 7. It is to be understood that this disclosure is not limited to any single specific embodiments or enumerated variations. Being only one exemplary of the embodiment.

Figure 11:
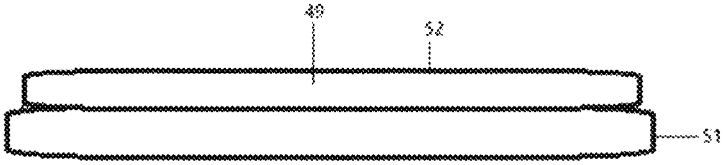
FIG. 11 shows another embodiment of assembly, a side view of a pad cover, which is removable from the wallboard and/or the wall support board bracket, pad cover which can slip over the front face side of the wallboard and/or the wall support board bracket, the pad's face side is constructed of a soft non-marring top surface over on elastic body, with an elastic opening to allow the pad cover to be installed or removed from the device, pad cover protects the wall from being damaged, mar or marked when wallboard and/or wall support board bracket is set on a wall's surface.

FIG. 11 shows one exemplary embodiment of the device, a side view of removable pad 51, a variation of pad 5 which is shown in FIG. 1. FIG. 11 shows one exemplary embodiment of the device, a side view of removable pad 51. Removable pad 51 is constructed of the same type of material as pad 5, construction of rubber, vinyl, and/or any type of a soft coating known to the relevant arts that protects the wall's top finish. Removable pad 51 is a pad cover constructed of a soft non-marring top surface over an elastic body, removal pad 51 protects the wall from being damaged or marked when the wallboard 4 and/or wall support board bracket 11 is set to a wall surface, not shown in FIG. 11 is both wallboard 4 and wall support board bracket 11, FIG. 1 shows wallboard 4, and FIG. 10 shows wall support board bracket 11. FIG. 11 shows opening 49 where removable pad 51 is installed over wallboard 4 and/or wall support board bracket 11, FIG. 1 shows wallboard 4, and FIG. 10 shows wall support board bracket 11. FIG. 11 shows elastic edge 52 which allows removable pad 51 to be installed on and held over the face of wallboard 4 and/or wall support board bracket 11. Being only one embodiment of the device.

FIG. 12 shows strap 8. Strap 8 can be of any material be it natural, cloth or man made material, known to the relevant art, FIG. 1 shows strap 8 with more details of the construction and use of strap 8. Showed is strap hole(s) 29 in strap 8. Strap hole(s) 29 are hole(s) which allow installing of strap 8 and/or complete removal of strap 8 to and from knob 10 with only a layman's hands, knob 10 is not shown in FIG. 12, FIG. 1 shows knob 10, FIG. 1 shows the ladder stand mounted to ladder leg 1, by installing one of strap hole(s) 29 of strap 8, over knob 10 and running strap 8 under ladder rung 40 and back up onto knob 10 using the second strap hole 29 to install the ladder stand to the ladder. Not shown in FIG. 12 is knob 10 and ladder rung 40, FIG. 1 shows knob 10 and ladder rung 40. Being of only one particular version of the invention.

FIG. 13 shows the left side of ladder cap 2, FIG. 1 shows the right side of ladder cap 2, one exemplary embodiment of the assembly of the device. FIG. 13 shows one exemplary embodiment of the assembly of the device in which the ladder cap 2 is detached from wallboard bracket 3, not shown, FIG. 1 shows wallboard bracket 3. Shown is hole 61 with pivot rod 7 installed into hole 61, not shown is cotter key 15, FIG. 5 shown cotter key 15, FIG. 4 shows hole 61 with greater details. Hole 61 allows both wallboard bracket 3, not shown and ladder cap(s) 2 to pivot on pivot rod 7, without sleeve 30, not shown, FIG. 3 shows sleeve 30 in ladder cap 2, FIG. 1 shows sleeve 30 in wallboard bracket 3. Hole(s) 61 are sized to allow pivot rod 7 to pass firmly through said hole(s) 61 without sleeve 30, not shown, sleeve 30 is a polished sleeve and/or bearing ring, which will reduce friction on pivot rod 7, but not required for the device to operate. Depending on material use in manufacturing of pivot rod 7, any known to the relevant arts, pivot rod 7 is sized at a minimum of two times stronger than the expected weight load of both the user and the extension ladder, being of only one particular version of the invention. FIG. 13 shows knob 10, not shown is strap 8, strap 8 has been completely removed from knob 10, FIG. 1 shows strap 8. FIG. 13 shows strap bracket 35 is mounted on the back side of ladder cap 2, without belt strap 36, not shown is belt strap 36, FIG. 3 shows is belt strap 36, one particular version of the invention. Shown in FIG. 13 is knob 10 and strap bracket 35, the exact placement or location of knob 10 strap and/or bracket 35 on ladder cap 2 is only relevant in so long as they retain the ability to fasten ladder cap 2 onto ladder rung 40, ladder rung 40 is not shown, nor is ladder rung 40 a part on the device, FIG. 1 shows ladder rung 40 and how the invention is installed to said ladder safely, being of only one particular version of the invention. FIG. 13 shows slot 22 which allows users to see that the ladder cap(s) 2 are visually seated down on an extension ladders rails. FIG. 13 shows eyelet 25, not shown in FIG. 13 is spring 9, spring rod 27 or clip 31, FIG. 1 shows spring 9, spring rod 27 and clip 31. Being of only one particular version of the invention.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

Different features, variations, and multiple different embodiments have been shown and described in various detail. What has been described in this application at times in 21 terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations, and other embodiments will come to mind of those skilled in the art, and which are intended to be and are covered by this disclosure. It is indeed intended that the scope of this disclosure should be determined by a proper legal interpretation and construction of the disclosure, including equivalents, as understood by those of skill in the art relying upon the complete disclosure present at the time of filing.

What is claimed is:

1. An assembly of a ladder support stand that automatically pivots to match the angle of an extension ladder to a wall when set up for use on the wall, the ladder support stand comprising:

a ladder having ladder's legs;

an extension of ladder's legs;

a pair of ladder caps, said ladder caps are used one on each side of the ladder support stand, that seats over and down the top of both of the extension ladder's legs;

a pair of eyelets attached to an upper front side of each said ladder caps;

a wallboard that rests on the wall;

a pad which is attached permanently and/or removable from the front side of said wallboard;

a set of wallboard brackets installed to the back side of said wallboard, lined up horizontally and vertically to each other, one each of the wallboard brackets is placed at the far right side and the far left side and a third in a center of said wallboard, the wallboard brackets are set at 90 degrees to said wallboard, the center of said wallboard bracket adds additional support to the ladder stand; or a wall support board bracket, said wall support board bracket can be constructed as single piece of the ladder support stand, with said wallboard brackets and said wallboard is constructed as a single unit, as a single part designed and that preform same functions in all ways as the wallboard brackets and said wallboard in the device;

a pair of holes, said each hole in each of the said wallboard brackets and said ladder caps the holes line up horizontally and vertically to each other in said wallboard brackets and the said ladder caps;

a pivot rod installed through the holes in the ladder caps and the wallboard brackets, the ladder caps are placed one on each side the center of said wallboard bracket and the pivot rod protrudes out of both sides of said wallboard brackets, the ladder caps and the wallboard bracket(s) pivot on the pivot rod, which allows the wallboard to match the wall's angle when the ladder with the ladder stand installed is set up on a wall, the wallboard brackets will pivot on said pivot rod and that will allow the wallboard to set flat to the wall's surface regardless of the angle of wall to ladder support stand;

a pair of a cotter keys, said cotter keys are installed through said pivot rod, at each end of the pivot rod, the cotter keys are installed on the outside of the outer said wallboard brackets, said cotter keys are located at the far left side and far right side of said wallboard brackets or right and left sides any of said wallboard brackets, and still allowing the pivot rod to protruding out both sides of all said wallboard brackets, allowing said pivot rod to slide without dislocating from said wallboard brackets, said cotter keys allows movement of said wallboard brackets but stop the pivot rod from separating from said wallboard brackets or the ladder caps;

a pair of springs each attached to the eyelet of each of the said ladder caps;

a spring rod installed through holes in the wallboard bracket, the holes lines up horizontally and vertically to each other in said wallboard brackets, the spring rod protrudes out both sides of said wallboard brackets, said wallboard brackets are installed on to the wallboard or are part of said wallboard, said spring rod is installed through the said springs loops, the springs loops or hooks are attached to the eyelets at one end and the spring rod on the other end, said springs retain the wallboard upright until said wallboard is laid to the wall, at which time the wallboard and the wallboard brackets will pivot on pivot rod and that will allow the wallboard to set flat to the wall's surface regardless of the angle of wall to adder support stand, when the ladder support stand is installed on the top of an extension ladder; and a set of a clips which is installed through said spring rod in each end of the spring rod, the clips are installed on the outside of said wallboard brackets, located at the far left side and the far right of the said spring rod with the spring rod protruding out both sides of said wallboard brackets, secured and allowing the said spring rod to slide right or left without dislocating from said wallboard brackets, or said clips one located through said spring rod on the outside of any of the said wallboard brackets at the far left side and one at the far right side of any said wallboard brackets, said clips stop the spring rod from separating from said wallboard brackets, allowing said springs to move with the wallboard brackets and the wallboard.

2. An assembly of a ladder support stand, wherein said ladder support stand installs to an extension ladder or is removed from an extension ladder, without tools safely, said ladder support stand maintenance is performed without tools, main parts of said ladder support stand can be replaced without tools, comprising:

a pair of ladder caps, said pair of said ladder caps each can be placed manually over and down on each leg of the ladder at same time, the ladder caps are installed by hand;

a pair of eyelets attached to or a part of each of the ladder caps;

a pivot rod which is installed through a pair of said ladder caps;

a wallboard, that rest flat to wall;

a hole in each of the said wallboard brackets and said ladder caps the holes line up horizontally and vertically to each other in said wallboard brackets and the said ladder caps;

a set of three wallboard brackets, installed one at left and one at right end and one in the center of the wallboard, that line up horizontally and vertically to each other, the said pivot rod past through a set of three said wallboard brackets and the ladder caps, the ladder caps are installed one on each side the center said wallboard bracket, the said pivot rod connects said ladder caps to said wallboard brackets;

a slot installed through the top right side and left side of one of said ladder caps that visually allows the user to see that the ladder caps are seated safely and completely down on the ladder legs;

a pair of holes;

a pair of straps, said each strap with hole on each end the strap; and a pair of knobs on said ladder caps, said straps with said hole on each end that is placed over the knobs, other end the strap with the hole can be laced under or around a ladder's top rung and back up to secure the ladder caps to the ladder rung using said strap, the strap is secured back to said knob, placing the other said hole over the knobs;

a pair of strap brackets; and a pair of belt buckles; and a pair of belt straps, the strap brackets are attached to the ladder caps, said belt straps with the belt buckles attached at one end is installed into the strap brackets, the belt strap is looped under the ladder rung and back up to be looped on said belt buckle and security by hand;

a pair of cotter keys which is installed though the pivot rod on one end, the other end of the pivot rod is installed through the wallboard brackets and the ladder caps, the other cotter keys is installed into the far end of the pivot rod and stops the pivot rod from separating from said wallboard brackets and the ladder caps, the cotter keys can be removed and installed into said rod by hands, the removal of the cotter keys allows the pivot rod to separate from said wallboard brackets and separate the said ladder caps from the ladder support stand;

a pair of clips; and a spring rod that installs in the hole through each end of the wallboard brackets, the clips are installed through each end of said spring rod, said clips stops the spring rod from separating from the wallboard brackets, removal of the clips from the spring rod needs only your hand and allows the spring rod to separate from the wallboard brackets, removal of said clips only require by hands;

a pair of springs attached to said eyelets, which is attached to the ladder caps this allows said spring to be removed from said ladder caps, said spring rod installs through the end loop of the spring when said clips are removed from said spring rod, the spring rod slides out of the wallboard brackets and the springs, the spring is removed from the eyelet's other loop or hook in the spring, the ladder caps, the straps, wallboard brackets, the wall board, the pivot rod, the cotter keys, the spring rod, the clips and the spring all can be removed or installed by hands.

3. An assembly of a ladder support stand which is able to be adjusted to fit on extension ladders of different width and length, without use of a tool, comprising:

a wallboard which supports the weight of an extension ladder and user, when set to a wall;

a set of three wallboard brackets, one installed on each far side of the wallboard and a third located in center of said wallboard, said wallboard bracket can be mounted to or manufactured as part of said wallboard, the wallboard brackets set at 90 degree to said wallboard;

a pair of ladder caps, said ladder caps are placed manually over and down top of each leg of the ladder at same time, said ladder caps are installed one on each side of the said center wallboard bracket;

a pivot rod which is installed through the ladder caps and installed through the set of said wallboard brackets;

a hole in both sets of the ladder caps and the wallboard brackets which align both the ladder caps and the wallboard brackets horizontally and vertically to each other, said holes are sized to allow said pivot rod to be installed through the ladder caps and the wallboard brackets with minimum allowance, the ladder caps will slide horizontal between the wallboard brackets on the pivot rod, and both the ladder caps and the wallboard brackets can pivots on said pivot rod;

a pair of cotter keys, said pivot rod is secured by the cotter keys at each end of the outside far left side and far right side said wallboard brackets, on the wallboard, said pivot rod allows the ladder caps to slide farther apart or closer together to fit on different widths and length, of an extension ladder, said cotter keys holds the pivot rod in the wallboard brackets and the ladder caps without separating, when the ladder caps move horizontal;

a spring rod which is installed through a hole in the set of said wallboard brackets, the holes align horizontally and vertically for said spring rod to past through and align said wallboard brackets; and a pair of eyelets, said each eyelet mounted on front side each the ladder caps; and a pair of springs, each with the spring rod passing through one end of spring's end loop, one each of the springs are on either side of the wallboard bracket in center of the wallboards, said spring rod is installed through said wallboard brackets, said springs are attached at its other end to the eyelets on each of the said ladder caps, the said springs will slide horizontally both ways on said spring rod, said spring rod allows the ladder caps to slide farther apart or closer together to fit on different, of an extension ladders; and a pair of clips, said spring rod is secured by the clips, at each end of the outer most said wallboard brackets on the wallboard, the clips are installed through the spring rod, said spring rod allows the springs on the ladder caps to slide farther apart or closer together to fit on different width and length of an extension ladder, the ladder caps can slide apart or closer together to be attached to the device to fit different width extension ladders.

4. An assembly of a ladder support stand as in claim 1, said pad is disposed on front face of said wallboard, and the surface of the pad on front side of said pad is made of or coated with material of soft no mar vinyl or of material made of soft no mar soft rubber or any material of pad making that will not mark, mar or damage the wall's top coat or finished wall surface, wall covering refers to any wall, be it plaster, drywall, wood, wallpaper, paneling, painted, or metal, be it in a completed state of drywall or plaster or an uncompleted state of drywall or plaster, the pad can be installed on the wallboard or removed by an elastic edge that covers the wallboard's face side.

5. An assembly of a ladder support stand as in claim 1, said wallboard is constructed of a length longer than the building code requirements of structures spacing of a wall's vertical support members, spacing to be measured horizontally from on center to center of the vertical members, the wallboard will always rest on two or more vertical framing members at all time, distributing the ladder's weight and ladder's duty rated weight evenly on two or more framing members and a larger wall surface, said ladder support stand can be used inside a building, when the length of said wallboard is longer horizontally than building codes requirements of the wall's vertical support members spacing, a wall's support members are horizontally measured on center, which allows the weight to distributed over two or more vertical members of the walls framing in a residential or a commercial building, an extension ladder stand can be used on interior finished wall surfaces or stairways, without damaging the wall, work can be performed safely for both it's user and the wall.

* * * * *